UNITED STATES PATENT OFFICE.

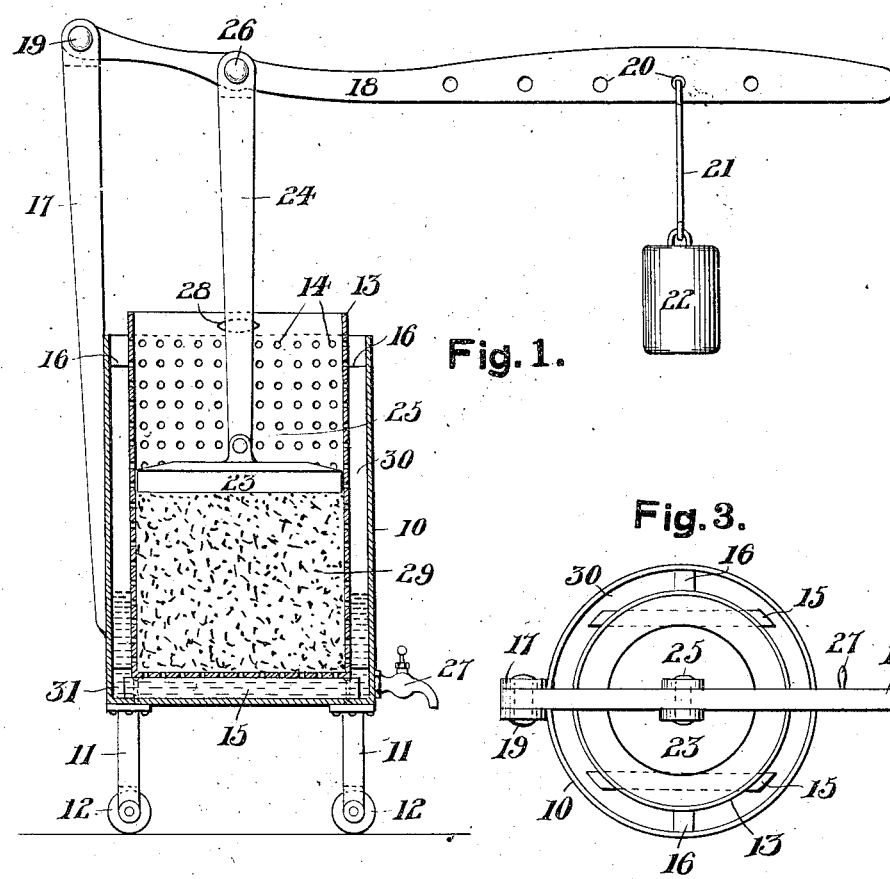

JOSEPH J. MARKOVICH, OF UNIONTOWN, PENNSYLVANIA.

HOUSEHOLD FRUIT-PRESS.

1,149,530.     Specification of Letters Patent.     Patented Aug. 10, 1915.

Application filed January 11, 1915. Serial No. 1,600.

*To all whom it may concern:*

Be it known that I, JOSEPH J. MARKOVICH, a citizen of the United States, residing at Uniontown, in the county of Fayette and State of Pennsylvania, have invented certain new and useful Improvements in Household Fruit-Presses, of which the following is a specification.

This invention relates to new and useful improvements in household fruit presses.

The primary object of this invention is to provide a press especially adapted for household use although the same may be made of any desired size and by means of which the juice is readily extracted from fruit such as grapes while the device is cheap and inexpensive to manufacture and is formed of only a few parts which are separable for cleaning purposes.

A further object of the device is to provide a foraminous fruit container removably positioned within a casing having an outlet valve while a reciprocating plunger shiftably mounted within the container is manually operable by a hand lever and a constant pressure is maintainable by the employment of a weight in connection therewith.

With these general objects in view and others that will appear as the nature of the invention is better understood, the same consists in the novel combination and arrangement of parts hereinafter fully described, illustrated in the accompanying drawings and pointed out in the appended claim.

In the drawings forming a part of this application and in which like designating characters refer to corresponding parts throughout the several views:—Figure 1 is a central vertical sectional view through the device. Fig. 2 is a top plan view thereof partially broken away showing the square form of the device, and Fig. 3 is a similar view of the cylindrical form thereof.

Referring more in detail to the drawings, it will be noted that an exterior opened topped casing 10 is provided mounted upon supporting legs 11 having rollers 12 journaled in the bottoms thereof and whereby the press may be readily moved about. A fruit container 13 also having an open top and provided with perforations 14 through the sides thereof is removably positioned within the casing 10 being seated upon two parallel cleats 15 secured to the bottom of the casing and whereby the container is elevated above the said bottom. Spacing strips 16 are secured longitudinally to the inner sides of the casing substantially centrally thereof between which strips the container is slidably inserted within the casing, the said strips being adapted to space the casing from the container.

A post 17 is secured in upright position to the casing and has one end of an operating lever 18 pivoted thereto at 19 and is provided with a plurality of openings 20 adjacent the free end thereof for the reception of a suspending hook 21 of a pressing weight 22. A piston 23 closely fitting within the container is adapted to be reciprocated therein by means of the piston rod 24 which has its opposite ends pivoted to the piston as at 25 and to the hand lever as at 26.

The casing is provided with a draw-off faucet 27 while the container has opposite hand-hold openings 28 whereby the container may be withdrawn from the casing after the piston and its rod have been removed therefrom.

The complete operation of the device will be at once apparent from this detailed description thereof in that the fruit or other matter to be pressed as indicated at 29 is positioned within the foraminous container 13. The piston is then seated upon the top of the fruit and the hand lever 18 moved downwardly for reciprocating the piston and exerting the pressure upon the fruit body whereby the juice is extracted therefrom which passes through the perforations 14 of the container into the intervening chamber or spacing 30 between the container and casing. The faucet 27 being in communication with the said chamber 30, the same is adapted to draw off the juice therefrom, which juice is herein illustrated as at 31. It will thus be seen that a fruit press especially adapted for household purposes is provided although the same may be made in any size desired. The weight 22 may be suspended from the operating lever 18 for giving a constant pressure of the piston upon the fruit when the same is found desirable and may be shifted to the desired one of the openings 20 for producing different degrees of leverage upon the piston.

It will be noted that in Fig. 2 the device is rectangular in cross section, while in Fig. 3 the same is shown as circular in cross section and the casing and container of cylindrical form. It will be noted that the elements as well as functions of the invention are identical in both forms illustrated and as indicated by the reference numerals in said Figs. 2 and 3 of the drawings.

While the form of the invention herein shown and described is what is believed to be the preferable embodiment thereof, it is nevertheless to be understood that minor changes may be made in the form proportion and details of construction without departing from the spirit and scope of the invention as set forth in the appended claim.

What I claim as new is:—

A device of the class described comprising a casing, spacing cleats within said casing upon the bottom thereof, spacing strips within the casing and longitudinally positioned centrally of the sides thereof, a foraminous container positioned within the said casing engaging the said cleats and strips and being spaced from the adjacent casing sides, the said container being provided with opposite hand-hold openings adjacent the top thereof, supporting rollers mounted beneath the said casing, a post secured to the casing, and operating lever pivoted to the upper end of said post and having a plurality of perforations longitudinally arranged adjacent the free end thereof, a piston mounted within said container, a piston rod pivoted at its opposite ends to the said piston and lever and a weight member removably suspended from the lever and engaging one of said perforations thereof.

In testimony whereof I affix my signature in presence of two witnesses.

JOSEPH J. MARKOVICH.

Witnesses:
A. W. HOUSE,
W. C. MULLAN.